United States Patent
Fukushima et al.

[11] Patent Number: 5,969,867
[45] Date of Patent: Oct. 19, 1999

[54] ACTIVE ENERGY RAY-CURABLE COMPOSITION AND LENS SHEET

[75] Inventors: Hiroshi Fukushima; Masao Hamada; Noriji Oishi; Yukichi Konami, all of Nagoya, Japan

[73] Assignee: Mitsubishi Rayon Company Ltd., Tokyo, Japan

[21] Appl. No.: 08/652,464

[22] PCT Filed: Oct. 17, 1995

[86] PCT No.: PCT/JP95/02128

§ 371 Date: Jun. 14, 1996

§ 102(e) Date: Jun. 14, 1996

[87] PCT Pub. No.: WO96/11964

PCT Pub. Date: Apr. 25, 1996

[30] Foreign Application Priority Data

Oct. 18, 1994 [JP] Japan .................................. 6-277151
Oct. 18, 1994 [JP] Japan .................................. 6-277153
Oct. 18, 1994 [JP] Japan .................................. 6-277154

[51] Int. Cl.$^6$ .............................. C08F 2/50; G02B 1/10; G03B 21/60
[52] U.S. Cl. .......................... 359/581; 359/455; 359/456; 359/457; 359/458; 359/586; 359/742; 359/40; 359/620; 428/1; 522/180
[58] Field of Search ...................... 522/172, 180, 522/182; 359/455, 456, 457, 458, 581, 586, 742, 640, 40; 428/1

[56] References Cited

U.S. PATENT DOCUMENTS

| | | | |
|---|---|---|---|
| 4,931,521 | 6/1990 | Matsuda et al. | 526/286 |
| 5,183,917 | 2/1993 | Maruyama et al. | 558/251 |
| 5,592,332 | 1/1997 | Nishio et al. | 359/619 |

FOREIGN PATENT DOCUMENTS

5-303003 11/1993 Japan .
06016754 1/1994 Japan .

*Primary Examiner*—Susan W. Berman
*Attorney, Agent, or Firm*—Oblon, Spivak, McClelland, Maier & Neustadt, P.C.

[57] ABSTRACT

An active energy ray-curable composition comprising (A) 20 to 80 parts by weight of a compound represented by the following general formula I:

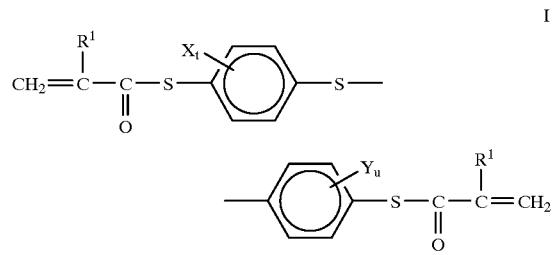

wherein $R^1$ represents hydrogen or methyl, X and Y may be the same or different and represent methyl, chlorine, bromine or iodine, and t and u each independently represent an integer of 0–2, (B) 20 to 80 parts by weight of at least one compound having at least one acryloyl or methacryloyl group in the molecule, or (B-1) 10 to 90 parts by weight of at least one compound having at least two acryloyl or methacryloyl groups in the molecule and (B-2) 1 to 90 parts by weight of at least one monoacrylate or monomethacrylate compound having one acryloyl or methacryloyl group in the molecule, and (C) 0.01 to 5 parts by weight of an active energy ray-sensitive radical polymerization initiator with respect to 100 parts by weight of the total of components (A) and (B) or components (A), (B-1) and (B-2), as well as a lens sheet comprising a lens section formed on at least one side of a transparent substrate using the composition.

8 Claims, 3 Drawing Sheets

ACTIVE ENERGY RAY-CURABLE COMPOSITION AND LENS SHEET

TECHNICAL FIELD

The present invention relates to an active energy ray-curable composition and to a lens sheet, such as a prism sheet, used in liquid crystal display devices and the like, a lenticular lens sheet or Fresnel lens sheet used for projection television screens or a lenticular lens sheet used for stereoscopic photography and the like.

BACKGROUND ART

Lens sheets, which include prism sheets used as backlight units for liquid crystal display devices and the like, Fresnel sheets and lenticular lens sheets used as projection screens for projection televisions and microfilm readers, and lenticular lens sheets used for stereoscopic photography and the like, have lens sections which are formed using active energy ray-curing compositions. Such lens sheets are constructed, for example, with a lens section made of a cured active energy ray-curable composition and formed on a transparent substrate. The active energy ray-curable composition used to form the lens section must have a variety of properties, including adhesion to the transparent substrate, releasability from the lens mold, and suitable optical characteristics.

Figure 1A:
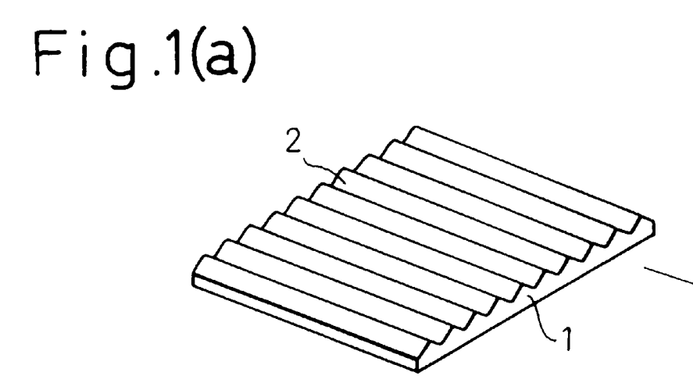
Figure 1B:
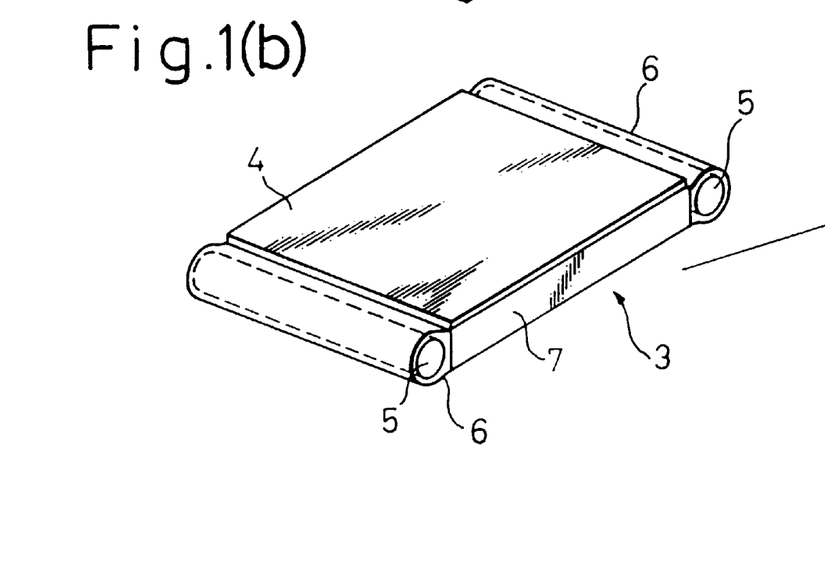
Figure 1C:
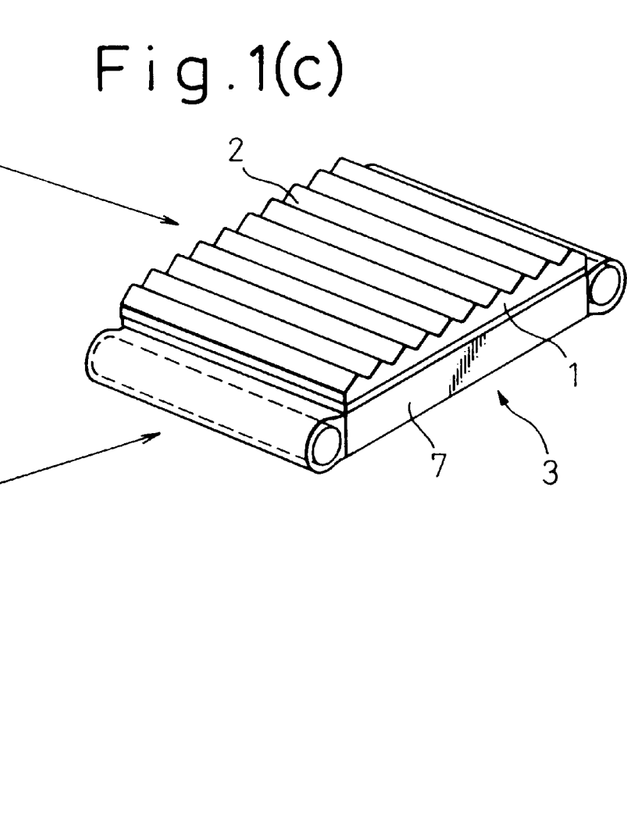

For example, in the case of backlights used for the color liquid crystal panels in color liquid crystal display devices for notebook computers, and in liquid crystal televisions and video-integrated liquid crystal televisions, it is important to reduce the power consumption to a minimum without lowering the brightness of the backlighting, and therefore greater optical efficiency has been desired for backlights. In this regard there has been proposed a backlight with enhanced brightness, wherein a prism sheet forming a prism row 2 on one side as shown in FIG. 1(*a*) is mounted on the light-emitting surface 4 of the backlight 3 shown in FIG. 1(*b*) in the manner shown in FIG. 1(*c*).

The proposed prism sheet is usually one with a prism row formed by press working on one side of a transparent sheet made of a thermoplastic resin, or one with a prism row, made of an ultraviolet ray-curable composition, formed on one side of a transparent sheet, with the material for the former being polymethyl methacrylate (refractive index: 1.49) or polycarbonate (refractive index: 1.59) and the ultraviolet curing composition used for the latter being a (meth) acrylate-based composition (refractive index of cured resin: 1.49–1.55).

However, with methods of fabricating prism sheets by the pressure formation method using thermoplastic resin transparent sheets, it is difficult to achieve a balance between the refractive index and transparency of the materials to make a prism sheet with a satisfactory brightness-enhancing effect, and with methods of fabricating prism sheets using the latter ultraviolet curing (meth)acrylate-based compositions, it becomes more difficult to sufficiently increase the refractive index the more the brightness of the prism sheet is enhanced. Furthermore, although prism sheets fabricated using materials with high refractive indexes contribute greatly to increased front brightness of the backlight, a disadvantage has been that the light transmittance tends to be lowered.

DISCLOSURE OF THE INVENTION

As a result diligent research regarding active energy ray-curable compositions in an attempt to overcome these problems of the prior art, the present inventors have found that it is possible to obtain cured products with high refractive indexes without causing lower light transmittance, to thus allow highly productive fabrication of lens sheets with a high brightness-enhancing effect, by using an acrylate or methacrylate composition having a specific composition, and the present invention has thus been completed.

The present invention provides an active energy ray-curable composition comprising (A) 20 to 80 parts by weight of a compound represented by the following general formula I:

wherein $R^1$ represents hydrogen or methyl, X and Y may be the same or different and represent methyl, chlorine, bromine or iodine, and t and u each independently represent an integer of 0–2, (B) 20 to 80 parts by weight of at least one compound having at least one acryloyl or methacryloyl group in the molecule, and (C) 0.01 to 5 parts by weight of an active energy ray-sensitive radical polymerization initiator with respect to 100 parts by weight of the total of components (A) and (B).

The present invention further provides an active energy ray-curable composition comprising (A) 20 to 80 parts by weight of a compound represented by general formula I above, (B-1) 10 to 90 parts by weight of at least one compound having at least two acryloyl or methacryloyl groups in the molecule, (B-2) 1 to 90 parts by weight of at least one monoacrylate or monomethacrylate compound having one acryloyl or methacryloyl group in the molecule, and (C) 0.01 to 5 parts by weight of an active energy ray-sensitive radical polymerization initiator with respect to 100 parts by weight of the total of components (A), (B-1) and (B-2).

The present invention further provides a resin sheet comprising a lens section formed using the above-mentioned active energy ray-curable composition on at least one side of a transparent substrate.

BRIEF DESCRIPTION OF THE DRAWINGS

FIGS. 1(*a*), (*b*) and (*c*) are schematic views illustrating a method of fabricating a high-brightness backlight using a prism sheet and a backlight.

A construction of a backlight 3, according to the present invention, is shown in FIGS. 1(*a*), (*b*) and (*c*). In the figure, a prism sheet 1, according to the present invention, has a row of multiple prisms 2 formed on one surface using an active energy ray-curable composition. The backlight 3 comprises a plate-shaped photoconductor 7 and linear light sources 5 such as a fluorescent light. The photoconductor 7 has a light-incident side surface and a light-emitting surface substantially perpendicular to the light-incident surfaces and a light-reflective surface is formed at the opposite side of the light-emitting surface. The linear light sources 5 are provided facing to the light-incident side surfaces of the photoconductor 7 and are covered by a light-reflective sheets 6. The light from the linear light sources 5 is introduced into the photoconductor 7 via the light-incident side surfaces and emitted from the light emitting surface 4 while a part of the incident light is reflected by the light-reflective surface.

BEST MODE FOR CARRYING OUT THE INVENTION

According to the present invention, the compound represented by general formula I used as component (A) of the active energy ray-curable composition is a component which improves the refractive index without lowering the transmittance of the cured active energy ray-curable composition of the invention.

Typical specific examples of compounds which may constitute component (A) include bis(4-methacryloylthiophenyl)sulfide, bis(4-acryloylthiophenyl)sulfide, bis(4-methacryloylthio-3,5-dichlorophenyl)sulfide, bis(4-acryloylthio-3,5-dichlorophenyl)sulfide, bis(4-methacryloylthio-3,5-dibromophenyl)sulfide, bis(4-acryloylthio-3,5-dibromophenyl)sulfide, bis(4-methacryloylthio-3,5-dimethylphenyl)sulfide, bis(4-acryloylthio-3,5-dimethylphenyl)sulfide, etc., and these may be used alone or in combinations of 2 or more.

Of the above-mentioned compounds, bis(4-methacryloylthiophenyl)sulfide is most preferred.

Component (A) is used in a proportion in the range of 20–80 parts by weight, and preferably 30–70 parts by weight. If the content of component (A) is less than 20 parts by weight, then the low refractive index of the lens section of the lens sheet makes it difficult to produce a lens sheet capable of exhibiting a high-brightness effect, whereas if the content of component (A) exceeds 80 parts by weight, not only is the mechanical strength of the lens section lowered, but deposition of the solid component (A) from the composition occurs during storage of the active energy ray-curing composition, which is undesirable as it tends to alter the composition.

Component (B), which is another compound having at least one (meth)acryloyl group in the molecule, is capable of dissolving the solid component (A), and it is a component which serves to improve the production workability of the lens section during fabrication of the lens sheet from the composition of the invention. Formation of a lens sheet using an active energy ray-curable composition according to the invention must allow excellent transfer of the lens shape of the lens mold, and component (B) is preferably a liquid at room temperature, with a low viscosity. Component (B) also preferably has a high dissolving power with respect to component (A). The type and amount of component (B) is selected based on the content of component (A), and the type and use of component (B) is also determined with consideration to the castability of the active energy ray-curable composition into the lens mold and its adhesion with the substrate sheet, as well as the refractive index of the lens section of the resulting lens sheet.

In cases where component (A) is used in a high proportion in the composition of the present invention, sedimentation of component (A) during storage may be minimized by using a compound having an aromatic group in the molecular structure as the molecule of component (B). Also, in order to improve the aforementioned castability of the composition of the invention into the lens mold, a low viscosity ester monomer is preferably used in combination therewith to adjust the viscosity of the active energy ray-curable composition.

Component (B) may be a mono- or poly(meth)acrylate of an aliphatic, alicyclic or aromatic mono- or polyalcohol, an aliphatic, alicyclic or aromatic urethane poly(meth)acrylate, epoxy poly(meth)acrylate, polyester poly(meth)acrylate, etc.

Specific examples of these include monofunctional ester (meth)acrylates such as methyl (meth)acrylate, butyl (meth)acrylate, 2-hydroxyethyl (meth)acrylate, cyclohexyl (meth)acrylate, tetrahydrofurfuryl (meth)acrylate, dicyclopentanyl (meth)acrylate, dicyclopentenyl (meth)acrylate, benzyl (meth)acrylate, phenyl (meth)acrylate, phenoxyethyl (meth)acrylate, 3-phenyl-2-hydroxypropyl (meth)acrylate, orthobiphenyl (meth)acrylate, 3-(2,4-dibromophenyl)-2-hydroxypropyl (meth)acrylate, 2,4,6-tribromophenoxyethyl (meth)acrylate, etc.; bifunctional ester (meth)acrylates such as 1,6-hexanediol di(meth)acrylate, neopentylglycol di(meth)acrylate, ethyleneglycol di(meth)acrylate, polyethyleneglycol (n=2–15) di(meth)acrylate, polypropyleneglycol (n=2–15) di(meth)acrylate, polybutyleneglycol (n=2–15) di(meth)acrylate, 2,2-bis(4-(meth)acryloxyethoxyphenyl) propane, 2,2-bis(4-(meth)acryloxydiethoxyphenyl) propane, 2,2-bis(4-(meth)acryloxyethoxy-3,5-dibromophenyl) propane, bis(4-(meth)acryloxydiethoxyphenyl) sulfone, etc.; polyfunctional ester (meth)acrylates such as trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, etc.; epoxy di(meth)acrylates obtained by reacting bisphenol A-type diglycidyl ethers and (meth)acrylic acid; epoxy di(meth)acrylates obtained by reacting tetrabromobisphenol A-type diglycidyl ethers and (meth)acrylic acid; urethane di(meth)acrylate obtained by reacting tolylene diisocyanate and 2-hydroxypropyl (meth)acrylate; urethane di(meth)acrylates obtained by reacting xylylene diisocyanates and 2-hydroxyethyl (meth)acrylate; and urethane di(meth)acrylates obtained by reacting isophorone diisocyanates and 2-hydroxypropyl(meth)acrylate.

These monomers may be used alone or in mixtures of 2 or more.

Component (B) is used in a proportion of 20 to 80 parts by weight, and preferably 30 to 70 parts by weight. A content of component (B) of less than 20 parts by weight is not preferred because not only is the mechanical strength of the lens section lowered, but deposition of the solid component (A) from the composition occurs during storage of the liquid composition, whereas a content of component (B) exceeding 80 parts by weight is also not preferred because the low refractive index of the lens section of the lens sheet makes it difficult to produce a lens sheet capable of exhibiting a high-brightness effect.

The active energy ray-curable composition of the present invention employs both of the aforementioned components (A) and (B) to obtain a cured product with no reduction in transparency and with a high refractive index of 1.56 or greater, and is thus suitable for use as a material for constructing lens sections of prism sheets, Fresnel lens sheets and lenticular lens sheets.

Also, the active energy ray-sensitive radical polymerization initiator as component (C) is preferably one which generates radicals when irradiated by active energy rays, typical of which are ultraviolet rays and visible light rays, and any publicly known one may be used, with no particular restrictions.

Specific examples of component (C) are radical polymerization initiators which are sensitive to visible light rays, including carbonyl compounds such as benzoin, benzoin monomethyl ether, benzoin isopropyl ether, acetoin, benzyl, benzophenone, p-methoxybenzophenone, diethoxyacetophenone, 2,2-dimethoxy-1,2,-diphenylethan-1-one, 2,2-diethoxyacetophenone, 1-hydroxycyclohexyl phenyl ketone, methylphenyl glyoxylate, ethylphenyl glyoxylate, 2-hydroxy-2-methyl-1-phenylpropan-1-one and 2-methyl-1-(4-(methylthio)phenyl)-2-morpholinopropanone-1; sulfur compounds such as tetramethylthiuram monosulfide and tetramethylthiuram disulfide; acylphosphine oxides such as 2,4,6-trimethylbenzoyldiphenylphosphine oxide; camphor quinone, bis(cyclopentadienyl)-bis(2,6-difluoro-3-(pyr-1-yl) titanium, etc.

These compounds for component (C) may be used alone or in mixtures of 2 or more.

Preferred among these compounds for component (C) are methylphenyl glyoxylate, 2-hydroxy-2-methyl-1-phenylpropan-1-one, 1-hydroxycyclohexylphenyl ketone, 2,2-dimethoxy-1,2-diphenylethan-1-one, benzyldimethyl ketal and 2,4,6-trimethylbenzoyldiphenylphosphine oxide.

Component (C) is used in a proportion in the range of 0.01 to 5 parts by weight, and preferably 0.02 to 3 parts by weight, with respect to 100 parts by weight of the total of components (A) and (B). Curable compositions with less than 0.01 part by weight of component (C) have insufficient curing properties, and component (C) is preferably present in the composition at no more than 5 parts by weight, because this causes yellowing of the lens section of the lens sheet formed by the composition.

As mentioned above, the composition of the invention may contain, instead of the aforementioned component (B), 10 to 90 parts by weight of component (B-1) consisting of at least one compound having at least two acryloyl or methacryloyl groups in the molecule, and 1 to 90 parts by weight of component (B-2) consisting of at least one monoacrylate or monomethacrylate compound having one acryloyl or methacryloyl group in the molecule.

Useful compounds as component (B-1) include compounds represented by the following general formula II:

wherein $R^2$ represents hydrogen or methyl, V and W are the same or different and represent methyl, chlorine, bromine or iodine, p and q each independently represent an integer of 0–2, $R^3$ represents m and n represent integers of 0–5, and Z represents Component (B-1) is a component which improves the mechanical strength of the lens section of the lens sheet produced with the composition of the invention. When forming the active energy ray-curable composition of the invention into a lens sheet, it is cast between a substrate sheet and a lens mold which transfers the lens shape, and it must be drawn to a precise thickness and must allow proper transfer of the lens mold shape, while component (B-1) preferably is a liquid at room temperature and has a low viscosity. Also, the solid component (A) preferably has a high degree of solubility in the component.

Specific examples of compounds constituting component (B-1) include ester monomers such as 2,2-bis(4-(meth)acryloyloxyphenyl)-propane, 2,2-bis(4-(meth)acryloyloxyethoxyphenyl)-propane, 2,2-bis(4-(meth)acryloyloxydiethoxyphenyl)-propane, 2,2-bis(4-(meth)acryloyloxytriethoxyphenyl)-propane, 2,2-bis(4-(meth)acryloyloxytetraethoxyphenyl)-propane, 2,2-bis(4-(meth)acryloyloxypentaethoxyphenyl)-propane, 2,2-bis(4-(meth)acryloyloxyethoxy-3,5-dibromophenyl)-propane, 2,2-bis(4-(meth)acryloyloxydiethoxy-3,5-dibromophenyl)-propane, bis(4-(meth)acryloyloxypentaethoxy-3,5-dibromophenyl)-propane, bis(4-(meth)acryloyloxyphenyl)-methane, bis(4-(meth)acryloyloxyethoxyphenyl)-methane, bis(4-(meth)acryloyloxydiethoxyphenyl)-methane, bis(4-(meth)acryloyloxytriethoxyphenyl)-methane, bis(4-(meth)acryloyloxytetraethoxyphenyl)-methane, bis(4-(meth)acryloyloxypentaethoxyphenyl)-methane, bis(4-(meth)acryloyloxydiethoxyphenyl)-sulfone, bis(4-(meth)acryloyloxypentaethoxyphenyl)-sulfone, bis(4-(meth)acryloyloxydiethoxyphenyl)-sulfide, bis(4-(meth)acryloyloxypentaethoxyphenyl)-sulfide, bis(4-(meth)acryloyloxydiethoxy-3,5-dimethylphenyl)-sulfide and bis(4-(meth)acryloyloxypentaethoxy-3,5-dimethylphenyl)-sulfide; and reaction products of bisphenol A-type epoxy compounds and methacrylic acid, reaction products of brominated bisphenol A-type epoxy compounds and methacrylic acid, reaction products of bisphenol F-type epoxy compounds and methacrylic acid and reaction products of bisphenol S-type epoxy compounds and methacrylic acid.

Any one of these monomers may be used alone, or 2 or more of them may be used in admixture.

Preferred among these compounds for component (B-1) are 2,2-bis(4-methacryloyloxyethoxyphenyl)-propane, 2,2-bis(4-acryloyloxyethoxyphenyl)-propane, 2,2-bis(4-methacryloyloxydiethoxyphenyl)-propane, 2,2-bis(4-acryloyloxydiethoxyphenyl)-propane, 2,2-bis(4-methacryloyloxytriethoxyphenyl)-propane, 2,2-bis(4-acryloyloxytriethoxyphenyl)-propane, 2,2-bis(4-methacryloyloxytetraethoxyphenyl)-propane, 2,2-bis(4-acryloyloxytetraethoxyphenyl)-propane, 2,2-bis(4- methacryloyloxypentaethoxyphenyl)-propane and 2,2-bis (4-acryloyloxypentaethoxyphenyl)-propane.

Component (B-1) is used in a proportion in the range of 10 to 90 parts by weight, and preferably 30 to 70 parts by weight. A content of component (B-1) of less than 10 parts by weight is not preferred because the transparency and mechanical strength of the lens section of the lens sheet is lowered, while deposition of the solid component (A) occurs during storage of the liquid composition tending to cause changes in the composition, whereas compositions with a content of component (B-1) exceeding 90 parts by weight do not give lens sections with sufficiently high refractive indexes.

Compounds useful as component (B-2) include compounds represented by the following general formulas III, IV, V and VI:

wherein $R^4$ represents hydrogen or methyl, G represents methyl, chlorine, bromine or iodine, i represents an integer of 0–5, j represents an integer of 0–4, $R^5$ represents and m and n represent integers of 0–5.

Component (B-2) is a component which serves to adjust the viscosity of the active energy ray-curable composition of the invention and the refractive index of the cured composition. When forming the active energy ray-curable composition of the invention into a lens sheet, castability into the lens mold, control of the thickness of the lens sheet and excellent transferability of the lens shape are crucial, and the use of component (B-2) improves the thickness control and transferability of the active energy ray-curable composition. Consequently, component (B-2) preferably is a liquid at room temperature and has a low viscosity.

Specific examples of compounds composing component (B-2) include phenyl (meth)acrylate, benzyl (meth)acrylate, phenoxyethyl (meth)acrylate, phenoxy-2-methylethyl methacrylate, phenoxyethoxyethyl (meth)acrylate, 3-phenoxy-2-hydroxypropyl (meth)acrylate, 2-phenylphenyl (meth)acrylate, 4-phenylphenyl (meth) acrylate, 2-phenylphenoxyethyl (meth)acrylate, 3-(2-phenylphenyl)-2-hydroxypropyl (meth)acrylate, 2-bromophenoxyethyl (meth)acrylate, 2,4-dibromophenoxyethyl (meth)acrylate, 2,4,6-tribromophenoxyethyl (meth)acrylate and 2-bromobenzyl (meth)acrylate.

Any one of these monomers may be used alone, or 2 or more of them may be used in admixture.

Preferred among these are phenyl (meth)acrylate, benzyl (meth)acrylate, phenoxyethyl (meth)acrylate, phenoxy-2-methylethyl (meth)acrylate, phenoxyethoxyethyl (meth) acrylate and 3-phenoxy-2-hydroxypropyl (meth)acrylate.

Component (B-2) is used in a proportion in the range of 1 to 50 parts by weight, and preferably 5 to 30 parts by weight. With a content of component (B-2) of less than 1 part by weight, sufficient viscosity adjustment of the active energy ray-curable composition cannot be accomplished, the castability into the lens mold is impaired, adhesion between the substrate sheet and lens section is lowered, and thickness control of the lens sheet and transferability of the lens shape are hindered. Lens sheets made from compositions with a content of component (B-2) exceeding 50 parts by weight are not preferred because they not only have lower refractive indexes, but this amount also results in lower mechanical strength of the lens section.

Here as well, component (C) is used in a proportion in the range of 0.01 to 5 parts by weight, and preferably 0.02 to 3 parts by weight, with respect to 100 parts by weight of the total of components (A), (B-1) and (B-2).

For improved solubility of component (A) and improved adhesion of the lens section formed by the composition onto the substrate sheet, a compound with a radical polymerizing functional group, other than a (meth)acrylate, may also be added to the active energy ray-curable composition of the present invention in a range which does not inhibit the effect of the invention. Specific examples of such compounds include styrene, styrene derivatives such as divinylbenzene, chlorostyrene, dibromostyrene, etc., allyl compounds such as diallyl phthalate, diethyleneglycol bis(allylcarbonate), etc. and fumaric acid derivatives such as dibenzyl fumarate, dibutyl fumarate, etc.

The active energy ray-curable composition of the invention may also contain, if necessary, other additives including anti-oxidants, anti-yellowing agents, ultraviolet absorbers, blueing agents, pigments, suspending agents, anti-foaming agents, anti-static agents, anti-fogging agents, and the like.

A lens sheet according to the invention employing an active energy ray-curable composition will now be explained with reference to the drawings.

Figure 2:
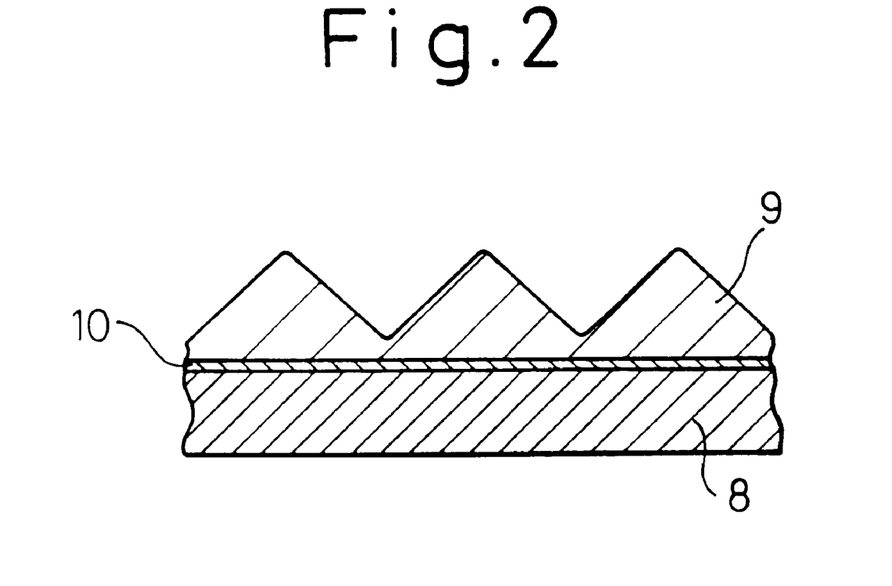
FIG. 2 is a partial cross-sectional view of a prism sheet.

The lens sheet of the invention comprises a transparent substrate sheet 8 and a lens section 9 such as a prism row made of a polymer obtained by curing an active energy ray-curable composition according to the invention, as shown in FIG. 2. The material of the transparent substrate sheet 8 may be a flexible glass plate which transmits ultraviolet rays, but for greater manageability there is preferably used a transparent synthetic resin sheet with a thickness of a few hundred μm, usually made of an acrylic resin, polycarbonate resin, vinyl chloride resin, polymethacrylimide resin or polyester resin. Particularly preferred are sheets made of polymethyl methacrylate, mixtures of polymethyl methacrylate and polyvinylidene fluoride-based resins, polycarbonate resins, polyethylene terephthalate and other polyester resins, which have relatively low refractive indexes and low surface reflectivity, and specifically, those with refractive indexes lower than the refractive index of the lens section are preferred. In such cases, an anchor coat-treated layer 10 may be provided for improved adhesion between the transparent substrate sheet 8 and the lens section 9 made by curing the active energy ray-curable composition, to obtain a lens sheet with stronger adhesion between the lens section 9 and the transparent sheet 8.

Figure 3:
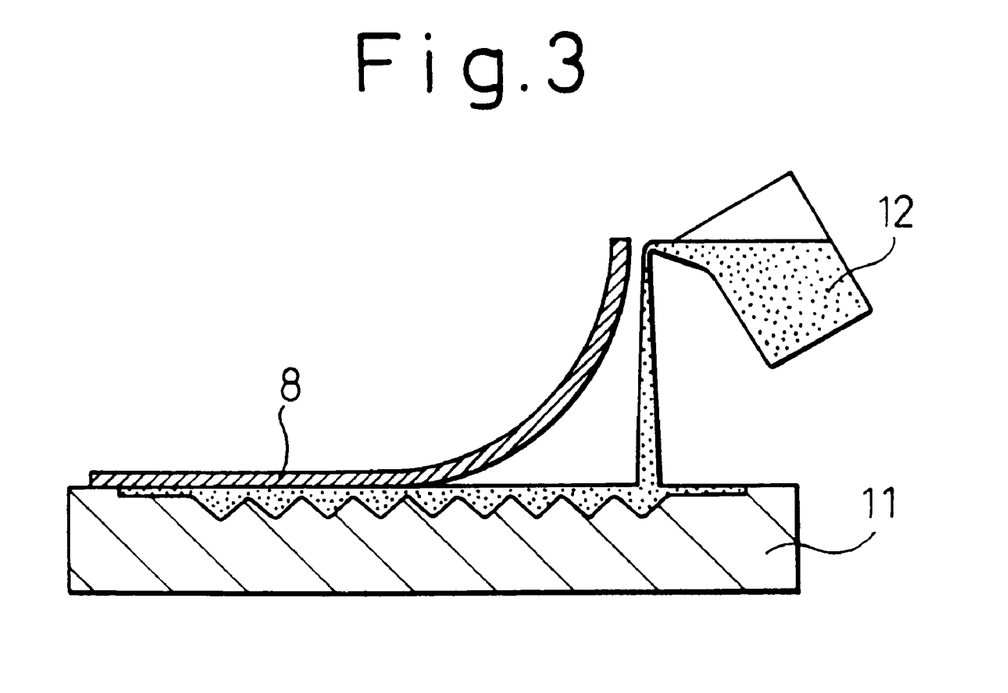
FIG. 3 is a schematic view illustrating a method of forming a prism sheet.
Figure 4:
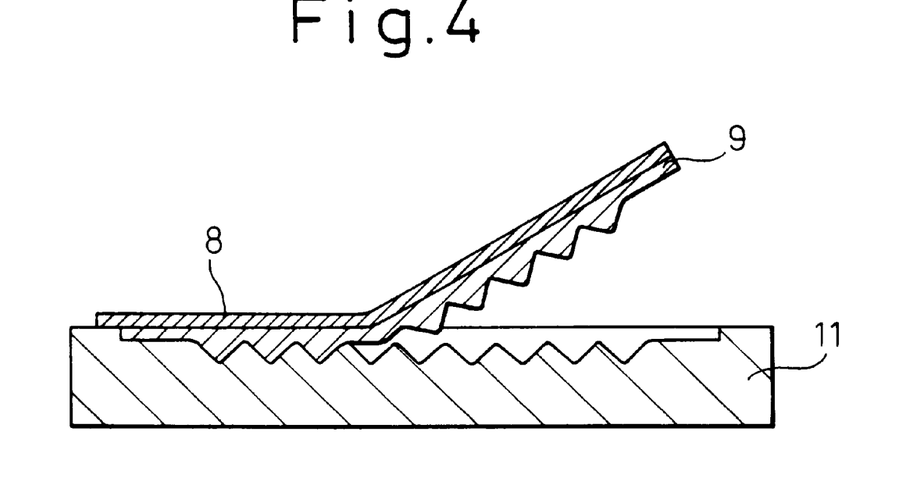
FIG. 4 is a schematic cross-sectional view showing a prism sheet as it is taken out of a mold.

For production of the lens sheet of the invention, as shown in FIG. 3, an active energy ray-curable composition 12 is cast and spread in a lens mold 11 which is made of metal, glass or resin and forms the lens shape of the prism row, etc., after which a transparent substrate sheet 8 is placed onto it and active energy rays from an active energy ray-emitting source are irradiated through the sheet 8 for curing. As shown in FIG. 4, the prepared lens sheet is then released from the lens mold 11 to obtain the lens sheet of the invention.

The active energy ray-emitting source may be a chemical reaction lamp, low pressure mercury lamp, high pressure mercury lamp, metal halide lamp, visible light halogen lamp, the suns rays, etc. The irradiation is conducted to a cumulative radiation energy of 0.1 to 50 J/cm$^2$ at a wavelength of 200–600 nm. The environment for irradiation of the active energy rays may be air, nitrogen or an inert gas such as argon.

Figure 5:
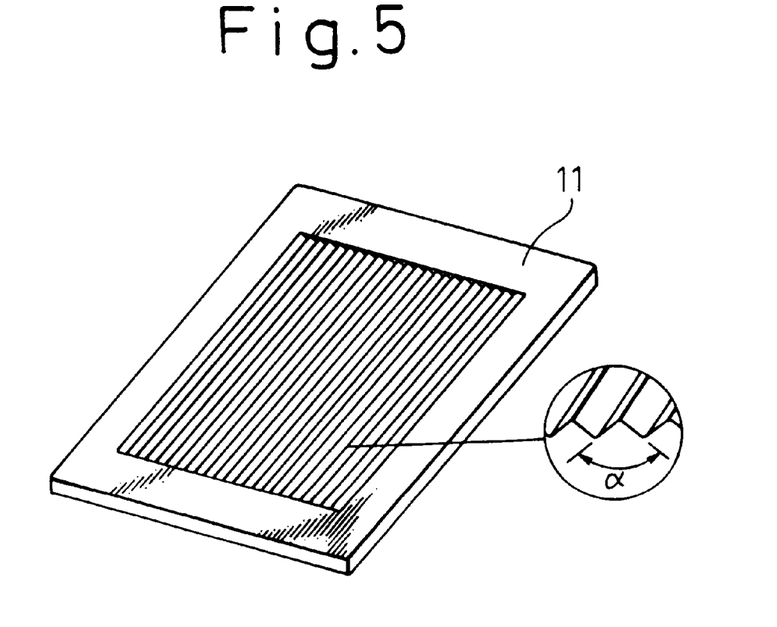
FIG. 5 is a perspective view of an embodiment of a mold for fabrication of a prism sheet.

The lens mold 11 used is one such as shown in FIG. 5, which, in the case of a prism sheet for example, is a prism mold 11 prepared with a prism shape having the vertical angle α shown in the insert circle. The lens mold may be made of a metal material such as aluminum, brass or steel, or a synthetic resin such as a silicone resin, urethane resin, epoxy resin, ABS resin, fluororesin or polymethylpentene resin, and/or the mold may be produced by plating any of the above-mentioned materials or mixing them with various material powders, but metal molds are preferred for use from the standpoint of heat resistance and strength.

The lens sheet obtained in the manner described above preferably has a lens section made of the cured active energy ray-curable composition with a high refractive index of 1.60 or higher, and more preferably 1.62 or higher. This is because a refractive index of the lens section, i.e. of the cured active energy ray-curable composition, of less than 1.60 will tend to result in insufficient enhancement in front brightness when it is used in a prism sheet for a backlight unit, for example. Also, when the lens sheet of the invention is used as a prism sheet for a backlight unit, a vertical angle α of the prism row in the range of 80° to 150° is preferred from the standpoint of the brightness-improving effect, and a range of 85° to 130° is more preferred.

The present invention is explained in more detail below by way of the following examples and comparative examples. The abbreviations of the monomers given in the examples and tables are as follows.

MPSMA: bis(methacryloylthiophenyl)sulfide (trade name: MPSMA, Sumitomo Seika)

BP-1: 2,2-bis(methacryloxyethoxyphenyl)propane (trade name: NK ester BPE-100N, Shin-Nakamura Chemical Co.)

POA: phenoxyethylacrylate (trade name: Viscoat #192, Osaka Organic Chemical Industries)

HMPO: 2-hydroxy-2-methyl-1-phenylpropan-1-one (trade name: Darocure 1173, Ciba-Geigy)

PEDA: polyethyleneglycol diacrylate (trade name: NK ester A-400, Shin-Nakamura Chemical Co.)

BPA-2: 2,2-bis(methacryloxyethoxyphenyl)propane (trade name: NK ester A-BPE-4, Shin-Nakamura Chemical Co.)

BPM-5: 2,2-bis(methacryloxypentaethoxyphenyl)propane (trade name: Fancryl FA-321M, Hitachi Kasei)

BZM: benzyl methacrylate (trade name: Acriester BZ, Mitsubishi Rayon)

PHM: phenyl methacrylate (Mitsubishi Rayon)

PSM-1: phenylthioethyl methacrylate (synthetic product)

PSM-2: phenylthioethoxyethyl methacrylate (synthetic product)

HMPO: 2-hydroxy-2-methyl-1-phenylpropan-1-one (trade name: Darocure 1173, Ciba Geigy)

APO: 2,4,6-trimethylbenzoyldiphenylphosphine oxide (trade name: Lucilin TPO, BASF Co.)

PET: polyester film (Toyobo Co., A4100, thickness: 188 μm)

PMMA: polymethyl methacrylate resin board (Mitsubishi Rayon, Acrylate L, thickness: 0,8 mm)

PC: polycarbonate resin board (Mitsubishi Gas Chemical Co., thickness: 0.5 mm)

EXAMPLE 1

(Preparation of Active Energy Ray-curable Composition)

A mixture of 50 g MPSMA, 30 g BP-1, 20 g POA and 2 g HMPO was heated to 50° C. and stirred to obtain a transparent uniform solution.

(Fabrication of Prism Sheet)

The mixed solution was cast into an approximately A4-sized brass prism mold 11 having a triangular pyramid prism row with a prism row pitch of 50 μm and a vertical angle α of 95° as shown in FIG. 5, and then, as shown in FIG. 3, a polyester film 8 of approximately the same size was placed over the cast side of the mixed solution, after which a 6.4 KW (80 W/cm) high-pressure mercury lamp situated 300 mm above the polyester film was used to irradiate 1.2 J/cm$^2$ of ultraviolet ray energy for 6 seconds to cure the mixed solution-applied layer, and this was released from the mold as shown in FIG. 4 to obtain a prism sheet.

(Evaluation of Active Energy Ray-curable Composition and Prism Sheet)

The prism sheet obtained in the above manner was evaluated according to the following methods, and the results are given in Table 1.

(1) Transparency of composition

The transparency of the composition prepared in the manner described above was judged visually as follows:

○: transparent x: turbid, cloudy (2) Castability of Composition into Mold

The castability of the composition into the mold and laminability of the substrate sheet were judged as follows:

○: easy to cast x: inclusion of bubbles, difficult to cast (3) Measurement of Prism Refractive Index For measurement of the refractive index of the prism section of the prism sheet obtained in the manner described above, the composition was cast into a mold prepared by inserting a gasket between two glass disks 65 mm in diameter and 3 mm in thickness to form a 1 mm gap and winding the perimeter fast with adhesive tape, and after one side of the glass mold was cured by irradiation with 10 J/cm$^2$ of ultraviolet ray energy for 50 seconds using a high-pressure mercury lamp in the same manner as before, the cured resin board was released from the glass mold and its refractive index was measured with an Abbe refractometer using a sodium D-ray light source at 20° C.

(4) Measurement of Brightness Enhancement

A prism sheet 1 having the construction shown in FIG. 1(a) fabricated in the manner described above was set on the backlight unit 3 shown in FIG. 1(*b*) comprising a Stanley cold-cathode tube 5, a reflective film 6, a Mitsubishi Rayon acrylic photoconductor 7 and a Toray dispersion film 4, and the brightness was measured at a position 1 m directly above the backlight unit, using a Topcon Model BM7 brightness photometer. Table 1 gives the relative brightnesses with respect to 1.00 as the brightness with no prism sheet on the backlight surface.

(5) Adhesion

A razor was used to make 11 cuts both lengthwise and widthwise spaced 1.5 mm apart on the prism row side of the prism sheet, each reaching the substrate film, to make 100 sections, after which cellophane adhesive tape (25 mm wide, product of Nichiban) was adhered onto the prism side and then rapidly peeled off, and the number of remaining sections on the prism row side were counted.

EXAMPLES 2–7

Comparative Examples 1–2

Prism sheets were prepared in the same manner as Example 1, except for using the compositions and substrate sheets shown in Table 1, and the results, evaluated in the same manner as Example 1, are also given in Table 1.

Comparative Example 3

After placing a 0.8 mm-thick PMMA film over a stamping section with the prism shape of the prism mold 11 shown in FIG. 5, the film having a slightly smaller size than the area of the stamping section, a 3 mm-thick polished stainless steel plate was placed on the laminated product and, together with the mold, was subjected to a uniform 50 t load while heating to 180° C., and after 3 hours of standing for cooling, it was released to prepare a PMMA prism sheet. The brightness of the prism sheet was then measured in the same manner as Example 1. The refractive index of the PMMA film was n=1.492.

Table 1 gives the relative brightnesses for Examples 1–7 and Comparative Examples 1–3 with respect to 1.00 as the brightness of a backlight with no prism sheet. The brightnesses of the backlights employing prism sheets obtained in the examples of the invention all clearly demonstrate more excellent brightness-enhancing effects than the comparative examples.

The absolute values for the relative brightnesses shown in Table 1 vary depending on the different backlights used, but in this test conducted by the present inventors, there was no reversal of the size relationship between the above-mentioned comparative examples and examples upon changing the type of backlight.

TABLE 1

|  | Mixing amounts of each component (g) | | | Substrate sheet | Transparency of composition | Castability of composition | Refractive index | Brightness | Adhesion |
| --- | --- | --- | --- | --- | --- | --- | --- | --- | --- |
|  | (A) | (B) | (C) |  |  |  |  |  |  |
| Ex. 1 | MPSMA (50) | BP-1(30) POA(29) | HMPO (2) | PET | ○ | ○ | 1.62 | 1.52 | 100 |
| Ex. 2 | MPSMA (70) | BP-1(10) POA(20) | HMPO (2) | PET | ○ | ○ | 1.65 | 1.61 | 100 |
| Ex. 3 | MPSAM (30) | BP-1(40) POA(30) | HMPO (2) | PET | ○ | ○ | 1.60 | 1.49 | 100 |
| Ex. 4 | MPSMA (40) | PEDA(20) POA(40) | HMPO (2) | PET | ○ | ○ | 1.60 | 1.48 | 100 |
| Ex. 5 | MPSMA (50) | BP-1(30) POA(20) | HMPO (2) | PMMA | ○ | ○ | 1.62 | 1.53 | 100 |
| Ex. 6 | MPSMA (50) | BP-1(30) POA(20) | HMPO (2) | PC | ○ | ○ | 1.62 | 1.51 | 100 |
| Ex. 7 | MPSMA (15) | BP-1(50) POA(35) | HMPO (2) | PET | ○ | ○ | 1.57 | 1.45 | 100 |
| Comp. Ex. 1 | — | BP-1(60) POA(40) | HMPO (2) | PET | ○ | ○ | 1.55 | 1.43 | 100 |
| Comp. Ex. 2 | MPSMA (95) | POA(5) | HMPO (2) | PET | x | x | not measurable | not measurable | 0 |
| Comp. Ex. 3 | — | — | — | PMMA | — | — | 1.49 | 1.39 | 0 |

EXAMPLE 8

(Preparation of Active Energy Ray-curable Composition)

A mixture of 40 g MPSMA, 50 g BPA-2, 10 g BZM and 2 g HMPO was heated to 50° C. and stirred to obtain a transparent uniform solution.

(Fabrication of Prism Sheet)

The mixed solution was cast into an approximately A4-sized brass prism mold 11 having a triangular pyramid prism row with a prism row pitch of 50 μm and a vertical angle α of 95° as shown in FIG. 5, and then, as shown in FIG. 3, a PET film 8 of approximately the same size was placed over the cast side of the mixed solution, after which a 6.4 KW (80 W/cm) high-pressure mercury lamp situated 300 mm over the PET film was used to irradiate 1.2 J/cm$^2$ of ultraviolet ray energy for 6 seconds to cure the mixed solution-applied layer, and this was released from the mold as shown in FIG. 4 to obtain a prism sheet.

(Evaluation of Active Energy Ray-curable Composition and Prism Sheet)

The prism sheet obtained in the above manner was evaluated, according to the methods in Example 1, and the results are given in Table 2.

EXAMPLES 9–13

Comparative Examples 4–6

Prism sheets were prepared in the same manner as Example 8, except for using the compositions and substrate sheets listed in Table 2, and the results evaluated in the same manner as Example 8 are also given in Table 2. For reference, the results of Comparative Example 3 are also give in Table 2.

Table 2 gives the relative brightnesses for Examples 8–13 and Comparative Examples 3–6 with respect to 1.00 as the brightness of a backlight with no prism sheet. The brightnesses of the backlights employing prism sheets obtained in the examples of the invention all clearly demonstrate more excellent brightness-enhancing effects than the comparative examples.

The absolute values for the relative brightnesses shown in Table 2 vary depending on the different backlights used, but in this test conducted by the present inventors, there was no reversal of the size relationship between the above-mentioned comparative examples and examples by changing the type of backlight.

mercury lamp situated 300 mm over the PET film was used to irradiate 1.2 J/cm$^2$ of ultraviolet ray energy for 6 seconds for curing, and release from the mold gave a prism sheet provided with a prism row having a vertical angle of 90°.

(Evaluation of Active Energy Ray-curable Composition and Prism Sheet)

The active energy ray-curable composition and prism sheet produced in the above manner was evaluated, according to the methods in Example 1, and the results are given in Table 3.

EXAMPLES 15–19

Comparative Examples 7–9

Prism sheets were prepared in the same manner as Example 14, except for using the compositions and substrate sheets listed in Table 3, and the results evaluated in the same manner as Example 14 are also given in Table 3. For reference, the results of Comparative Example 3 are also give in Table 3.

Table 3 gives the relative brightnesses for Examples 14–19 and Comparative Examples 7–9 with respect to 1.00

TABLE 2

| | Mixing amounts of each component (g) | | | | Substrate sheet | Transparency of composition | Castability of composition | Refractive index | Brightness | Adhesion |
|---|---|---|---|---|---|---|---|---|---|---|
| | (A) | (B-1) | (B-2) | (C) | | | | | | |
| Ex. 8 | MPSMA (40) | BPA-2 (50) | BZM (10) | HMPO (2) | PET | ○ | ○ | 1.62 | 1.52 | 100 |
| Ex. 9 | MPSMA (70) | BPA-2 (15) | PZM (15) | HMPO (2) | PET | ○ | ○ | 1.66 | 1.63 | 100 |
| Ex. 10 | MPSAM (30) | BPA-2 (60) | BZM (10) | HMPO (2) | PET | ○ | ○ | 1.60 | 1.49 | 100 |
| Ex. 11 | MPSMA (45) | BPA-5 (20) | PHM (35) | APO (2) | PET | ○ | ○ | 1.63 | 1.62 | 100 |
| Ex. 12 | MPSMA (40) | BPA-2 (50) | BZM (10) | HMPO (2) | PMMA | ○ | ○ | 1.62 | 1.53 | 100 |
| Ex. 13 | MPSMA (45) | BPA-5 (20) | PHM (35) | APO (2) | PC | ○ | ○ | 1.62 | 1.51 | 100 |
| Comp. Ex. 4 | — | BPA-2 (60) | BZM (40) | HMPO (2) | PET | ○ | ○ | 1.55 | 1.43 | 100 |
| Comp. Ex. 5 | MPSMA (95) | — | BZM (5) | HMPO (2) | PET | x | x | not measurable | not measurable | 0 |
| Comp. Ex. 6 | MPSMA (50) | BPA-2 (50) | — | HMPO (2) | PET | ○ | x | 1.63 | 1.60 | 50 |
| Comp. Ex. 3 | — | — | — | — | PMMA | — | — | 1.49 | 1.39 | 0 |

EXAMPLE 14

(Preparation of Active Energy Ray-curable Composition)

A mixture of 40 g MPSMA, 50 g BPA-2, 30 g PSM-1 and 2 g HMPO was heated to 50° C. and stirred to obtain a transparent uniform solution.

(Fabrication of Prism Sheet)

The mixed solution was cast into an approximately A4-sized brass prism mold 11 having a triangular pyramid prism row with a pitch of 50 μm and a vertical angle α of 95° as shown in FIG. 5, and after application, an approximately A4-sized PET film 8 was placed over it as shown in FIG. 3, after which a 6.4 KW (80 W/cm) high-pressure as the brightness of a backlight with no prism sheet. The examples of the invention all clearly demonstrate more excellent brightness-enhancing effects than the comparative examples.

The absolute values for the relative brightnesses shown in Table 3 vary depending on the different backlights used, but in this study conducted by the present inventors, there was no reversal of the size relationship between the above-mentioned comparative examples and examples by changing the type of backlight.

TABLE 3

| | Mixing amounts of each component (g) | | | | Substrate sheet | Transparency of composition | Castability of composition | Refractive index | Brightness | Adhesion |
|---|---|---|---|---|---|---|---|---|---|---|
| | (A) | (B-1) | (B-2) | (C) | | | | | | |
| Ex. 14 | MPSMA (40) | BPA-2 (30) | PSM-1 (30) | HMPO (2) | PET | o | o | 1.63 | 1.64 | 100 |
| Ex. 15 | MPSMA (70) | BPA-2 (15) | PSM-1 (15) | HMPO (2) | PET | o | o | 1.66 | 1.65 | 100 |
| Ex. 16 | MPSAM (30) | BPA-2 (60) | PSM-2 (10) | HMPO (2) | PET | o | o | 1.61 | 1.59 | 100 |
| Ex. 17 | MPSMA (50) | BPA-5 (10) | PSM-2 (40) | APO (2) | PET | o | o | 1.65 | 1.64 | 100 |
| Ex. 18 | MPSMA (40) | BPA-2 (30) | PSM-1 (30) | HMPO (2) | PMMA | o | o | 1.63 | 1.65 | 100 |
| Ex. 19 | MPSMA (40) | BPA-2 (30) | PSM-1 (30) | APO (2) | PC | o | o | 1.63 | 1.63 | 100 |
| Comp. Ex. 7 | — | BPA-2 (60) | PSM-1 (40) | HMPO (2) | PET | o | o | 1.58 | 1.45 | 100 |
| Comp. Ex. 8 | MPSMA (95) | — | PSM-1 (5) | HMPO (2) | PET | x | x | not measurable | not measurable | 0 |
| Comp. Ex. 9 | MPSMA (10) | BPA-2 (10) | PSM-1 (80) | HMPO (2) | PET | o | o | 1.61 | 1.50 | 10 |
| Comp. Ex. 3 | — | — | — | — | PMMA | — | — | 1.49 | 1.39 | 0 |

Industrial Applicability

As explained above, the active energy ray-curable composition of the present invention gives a cured product with a high refractive index without reduction in transparency, and thus when used as a material for the lens section of a lens sheet with the lens section formed on the surface of a transparent substrate, it can notably enhance the front brightness of the lens sheet and provide a lens sheet with satisfactory manageability and productivity.

We claim:

1. A lens sheet, comprising a transparent substrate and a lens section formed on at least one side of the transparent substrate wherein the lens section is formed from an active energy ray-curable composition and, wherein the active energy ray-curable composition comprises:

(A) 20 to 80 parts by weight of a compound represented by the following general formula I:

wherein $R^1$ represents hydrogen or methyl, X and Y may be the same or different and represent methyl, chlorine, bromine or iodine, and t and u each independently represent an integer of 0–2,

(B-1) 10 to 90 parts by weight of at least one compound represented by the following general formula II:

wherein $R^2$ represents hydrogen or methyl, V and W may be the same or different and represent methyl, chlorine, bromine or iodine, p and q each independently represent an integer of 0–2, $R^3$ represents m and n represent integers of 0–5, and z represents (B-2) 1 to 90 parts by weight of at least one monoacrylate or monomethacrylate compound having one acryloyl or methacryloyl group in the molecule, and

(C) 0.01 to 5 parts by weight of an active energy ray-sensitive radical polymerization initiator with respect to 100 parts by weight of the total of said components (A), (B-1) and (B-2), and wherein said component (A) and (B-1) are different from each other.

2. A lens sheet according to claim 1, wherein the compound constituting said component (A) is bis(4-methacryloylthiophenyl)sulfide.

3. A lens sheet according to claim 1, wherein the compound having at least two acryloyl or methacryloyl groups in the molecule, which constitutes said component (B-1), is selected from 2,2-bis(4-methacryloyloxyethoxyphenyl)-propane, 2,2-bis(4-acryloyloxyethoxyphenyl)-propane, 2,2-bis(4-methacryloyloxydiethoxyphenyl)-propane, 2,2-bis(4-acryloyloxydiethoxyphenyl)-propane, 2,2-bis(4-methacryloyloxytriethoxyphenyl)-propane, 2,2-bis(4-acryloyloxytriethoxyphenyl)-propane, 2,2-bis(4-methacryloyloxytetraethoxyphenyl)-propane, 2,2-bis(4-acryloyloxytetraethoxyphenyl)-propane, 2,2-bis(4-methacryloyloxypentaethoxyphenyl)-propane and 2,2-bis(4-acryloyloxypentaethoxyphenyl)-propane.

4. A lens sheet according to claim 1, wherein the monoacrylate or monomethacrylate compound which constitutes said component (B-2) is selected from compounds represented by the following general formulas III, IV, V and VI:

wherein $R^4$ represents hydrogen or methyl, G represents methyl, chlorine, bromine or iodine, i represents an integer of 0–5, j represents an integer of 0–4, $R^5$ represents and m and n represent integers of 0–5.

5. A lens sheet according to claim 4, wherein the monoacrylate or monomethacrylate compound which constitutes said component (B-2) is selected from phenyl methacrylate, phenyl acrylate, benzyl methacrylate, benzyl acrylate, phenoxyethyl methacrylate, phenoxyethyl acrylate, phenoxy-2-methylethyl methacrylate, phenoxyethoxyethyl methacrylate, phenoxyethoxyethyl acrylate, 3-phenoxy-2-hydroxypropyl methacrylate, 3-phenoxy-2-hydroxypropyl acrylate, 2-phenylphenyl methacrylate, 2-phenylphenyl acrylate, 4-phenylphenyl methacrylate, 4-phenylphenyl acrylate, 2-phenylphenoxyethyl methacrylate, 2-phenylphenoxyethyl acrylate, 3-(2-phenylphenyl)-2-hydroxypropyl methacrylate, 3-(2-phenylphenyl)-2-hydroxypropyl acrylate, 2-bromophenoxyethyl methacrylate, 2-bromophenoxyethyl acrylate, 2,4-dibromophenoxyethyl methacrylate, 2,4-dibromophenoxyethyl acrylate, phenylthioethyl methacrylate, phenylthioethyl acrylate, phenylthioethoxy methacrylate, phenylthioethoxy acrylate, phenylthiodiethoxy methacrylate, phenylthiodiethoxy acrylate, 2-phenylphenylthioethyl methacrylate, 2-phenylphenylthioethyl acrylate, 4-chlorophenylthioethyl methacrylate, 4-chlorophenylthioethyl acrylate, benzylthioethyl methacrylate and benzylthioethyl acrylate.

6. The lens sheet according to claim 1, wherein the refractive index of said lens section is 1.60 or greater.

7. The lens sheet according to claim 1, wherein said lens section is in the form of a minute prism row.

8. The lens sheet according to claim 7, wherein the vertical angle of each of the prisms of said minute prism row is 80–150°.

* * * * *